(12) United States Patent
     Balk

(10) Patent No.: US 10,443,640 B2
(45) Date of Patent: Oct. 15, 2019

(54) PORTABLE TABLE ASSEMBLY

(71) Applicant: Greg Balk, East Northport, NY (US)

(72) Inventor: Greg Balk, East Northport, NY (US)

( * ) Notice: Subject to any disclaimer, the term of this patent is extended or adjusted under 35 U.S.C. 154(b) by 221 days.

(21) Appl. No.: 15/152,615

(22) Filed: May 12, 2016

(65) Prior Publication Data

US 2017/0325586 A1    Nov. 16, 2017

(51) Int. Cl.
     *A47B 85/00*   (2006.01)
     *F16B 7/10*    (2006.01)
     *A47B 13/16*   (2006.01)
     *F16B 2/08*    (2006.01)

(52) U.S. Cl.
     CPC ............ *F16B 7/105* (2013.01); *A47B 13/16* (2013.01); *F16B 2/08* (2013.01)

(58) Field of Classification Search
     CPC ....... A47B 96/02; A47B 23/02; A47B 23/025; A47B 23/04; A47B 23/041
     USPC .............. 108/42, 47, 48, 49, 134, 135, 152, 108/157.11, 157.18; 297/135, 188.2
     See application file for complete search history.

(56) References Cited

U.S. PATENT DOCUMENTS

| | | | | |
|---|---|---|---|---|
| 3,239,272 A | * | 3/1966 | Wilkins | A47C 7/68 211/119.007 |
| 3,894,496 A | | 7/1975 | Phillips et al. | |
| 4,339,061 A | * | 7/1982 | Dunn | A61G 5/10 116/67 R |
| 4,657,302 A | * | 4/1987 | Snyder | A47C 1/124 108/64 |
| 4,819,986 A | * | 4/1989 | Markus | A47C 1/0248 297/276 |
| 4,889,057 A | * | 12/1989 | Chartrand | A47B 85/04 100/38 |
| 4,943,041 A | * | 7/1990 | Romein | A47B 3/083 108/36 |
| 5,251,956 A | | 10/1993 | Hofmeyer | |
| D346,516 S | | 5/1994 | Anna et al. | |
| 5,528,993 A | * | 6/1996 | Vincelli | A47B 5/06 108/42 |
| 5,564,779 A | | 10/1996 | Tolbert et al. | |
| 5,865,124 A | | 2/1999 | Wroe | |
| 5,918,550 A | * | 7/1999 | Weir | A47B 5/06 108/152 |
| 6,691,927 B1 | | 2/2004 | Malloy | |
| 8,561,550 B2 | * | 10/2013 | Raml | A47B 5/00 108/152 |
| 2004/0046428 A1 | | 3/2004 | Hwang | |
| 2005/0006936 A1 | * | 1/2005 | Markus | A47C 1/024 297/325 |

(Continued)

*Primary Examiner* — Matthew W Ing

(57) ABSTRACT

A portable table assembly includes a table that may to support items. A plurality of fasteners is provided and each of the fasteners is movably coupled to the table. Each of the fasteners may be selectively coupled to a chair thereby facilitating the table to be accessible from the chair. Each of the fasteners is movably coupled to the table. Thus, the plurality of fasteners may accommodate a variety of chair sizes. A first coupler is attached to the table. The first coupler may engage an item thereby facilitating the table to be selectively coupled to the item. A leg is hingedly coupled to the table an the leg is selectively positioned in a deployed position. Thus, the leg may abut a support surface thereby facilitating the table to be horizontally oriented with respect to the support surface.

5 Claims, 6 Drawing Sheets

(56) References Cited

U.S. PATENT DOCUMENTS

2012/0048150 A1* 3/2012 Moore .................... E03C 1/328
108/20

* cited by examiner

PORTABLE TABLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to table devices and more particularly pertains to a new table device for PURPOSE.

BRIEF SUMMARY OF THE INVENTION

An embodiment of the disclosure meets the needs presented above by generally comprising a table that may to support items. A plurality of fasteners is provided and each of the fasteners is movably coupled to the table. Each of the fasteners may be selectively coupled to a chair thereby facilitating the table to be accessible from the chair. Each of the fasteners is movably coupled to the table. Thus, the plurality of fasteners may accommodate a variety of chair sizes. A first coupler is attached to the table. The first coupler may engage an item thereby facilitating the table to be selectively coupled to the item. A leg is hingedly coupled to the table and the leg is selectively positioned in a deployed position. Thus, the leg may abut a support surface thereby facilitating the table to be horizontally oriented with respect to the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The items of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and items other than those set forth above will become apparent when consideration is given to the following detailed description thereof. Such description makes reference to the annexed drawings wherein.

DETAILED DESCRIPTION OF THE INVENTION

Figure 1:
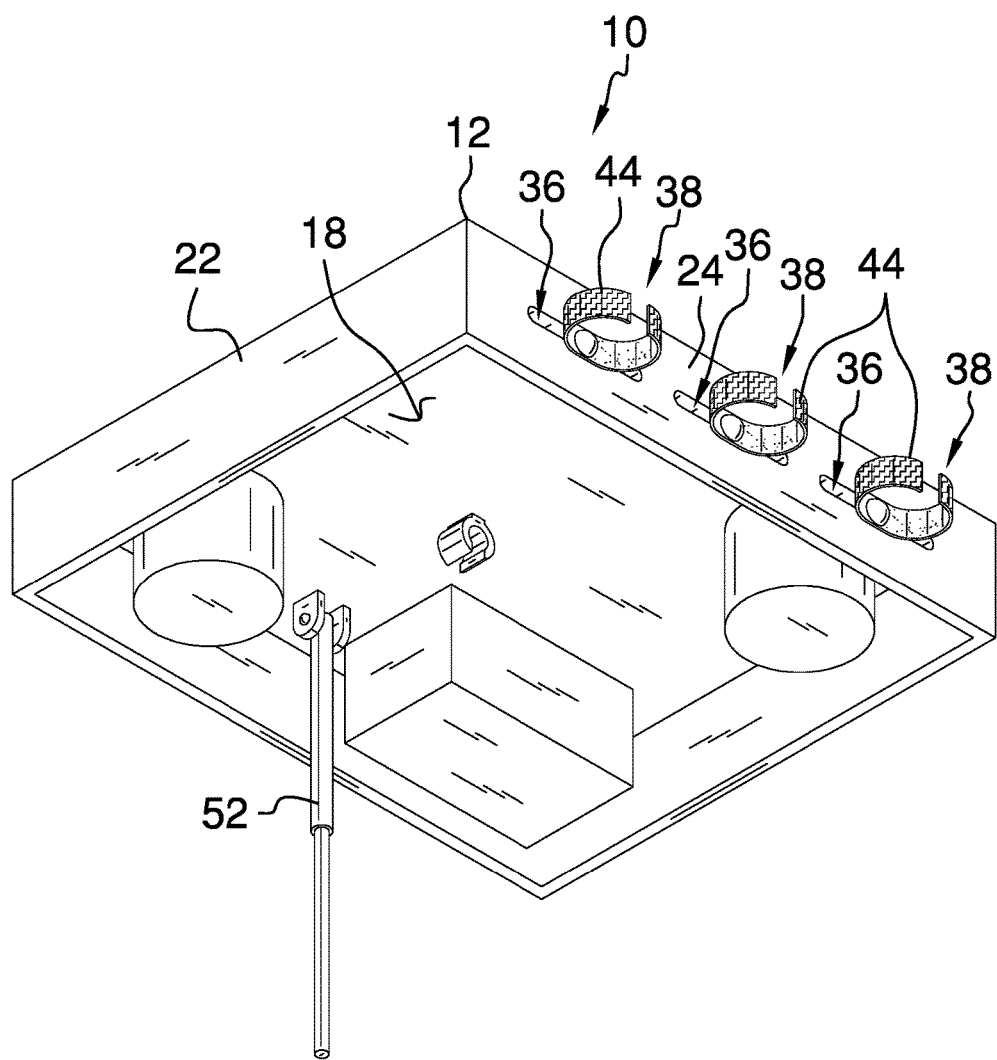
FIG. 1 is a bottom perspective view of a portable table assembly according to an embodiment of the disclosure.
Figure 2:
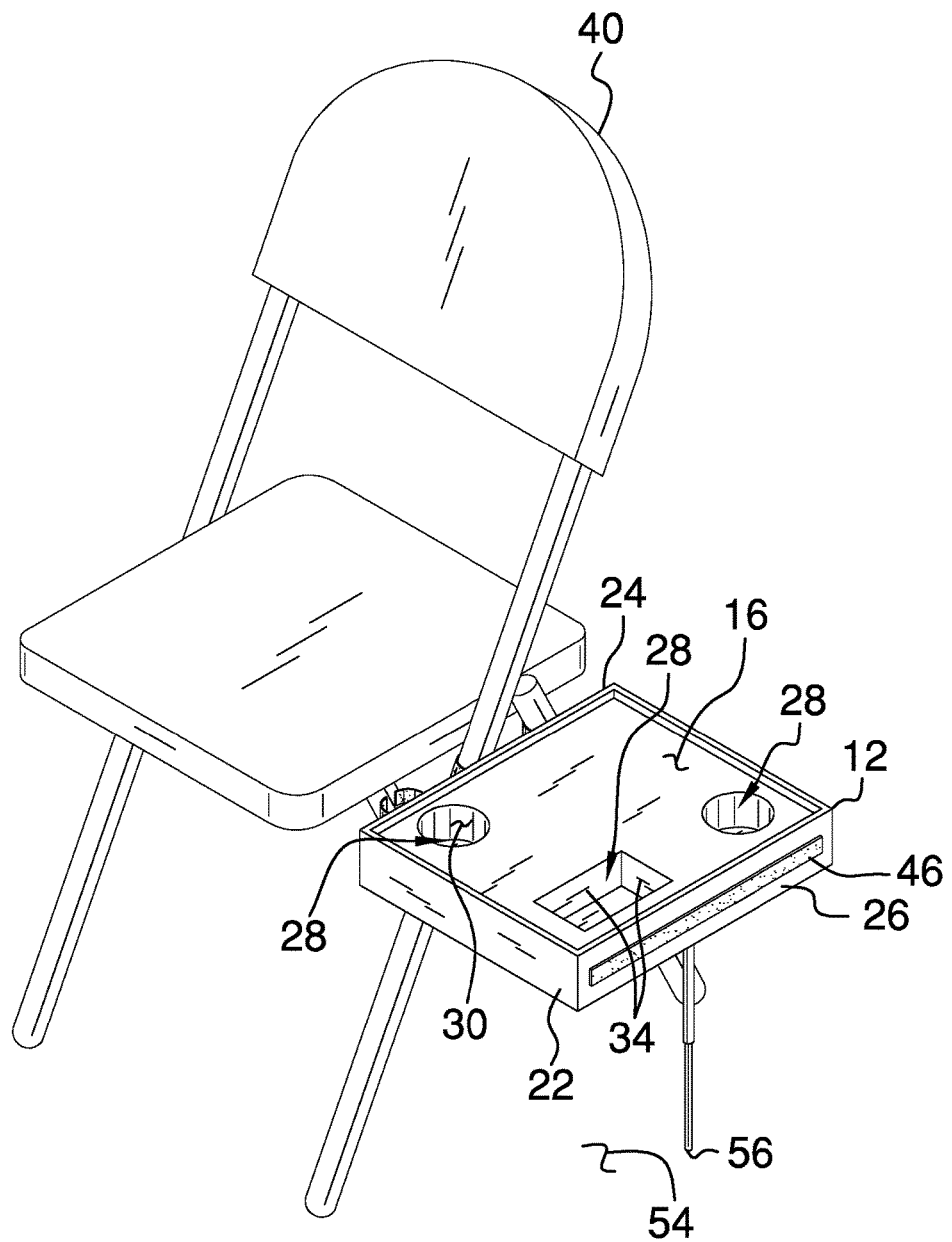
FIG. 2 is a top perspective in-use view of an embodiment of the disclosure.
Figure 3:
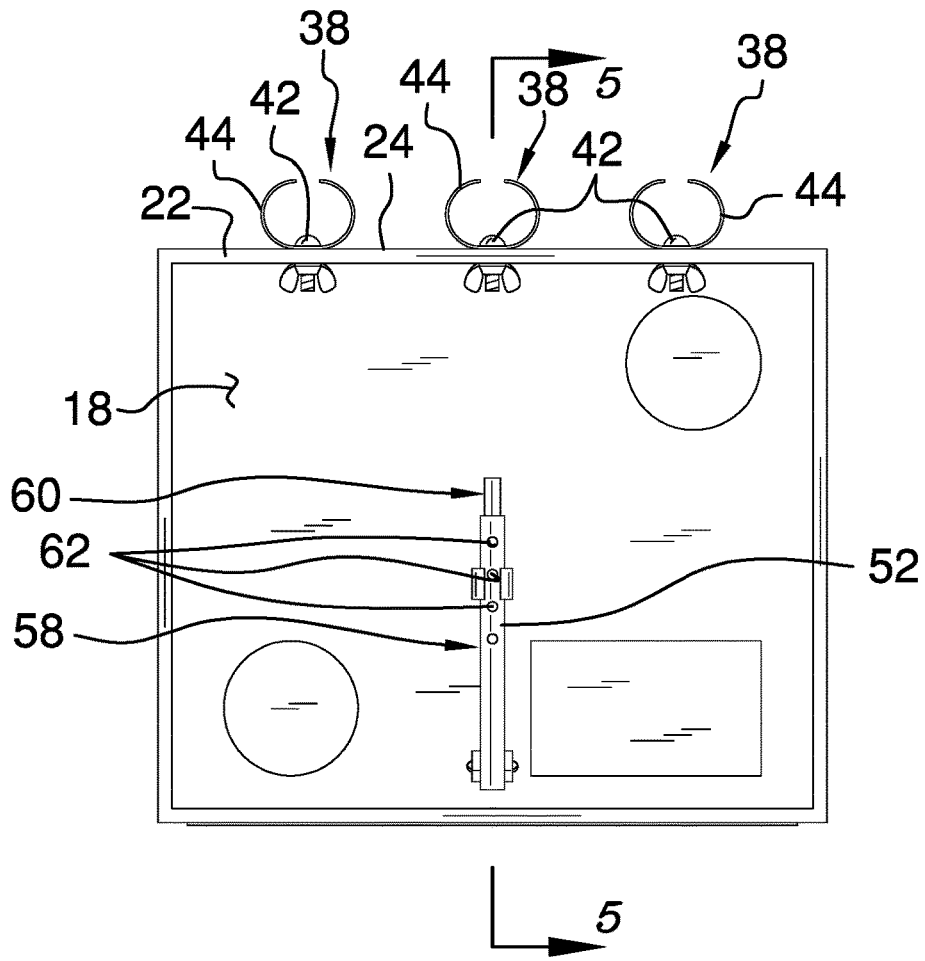
FIG. 3 is a right side view of an embodiment of the disclosure.
Figure 4:
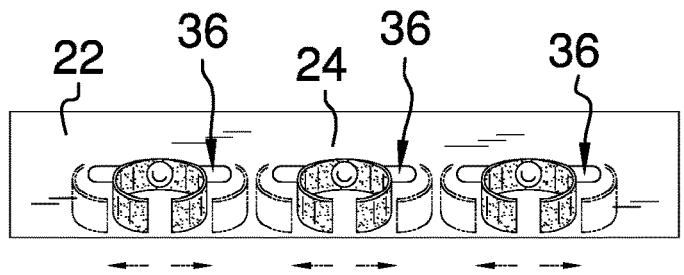
FIG. 4 is a bottom view of an embodiment of the disclosure.
Figure 5:
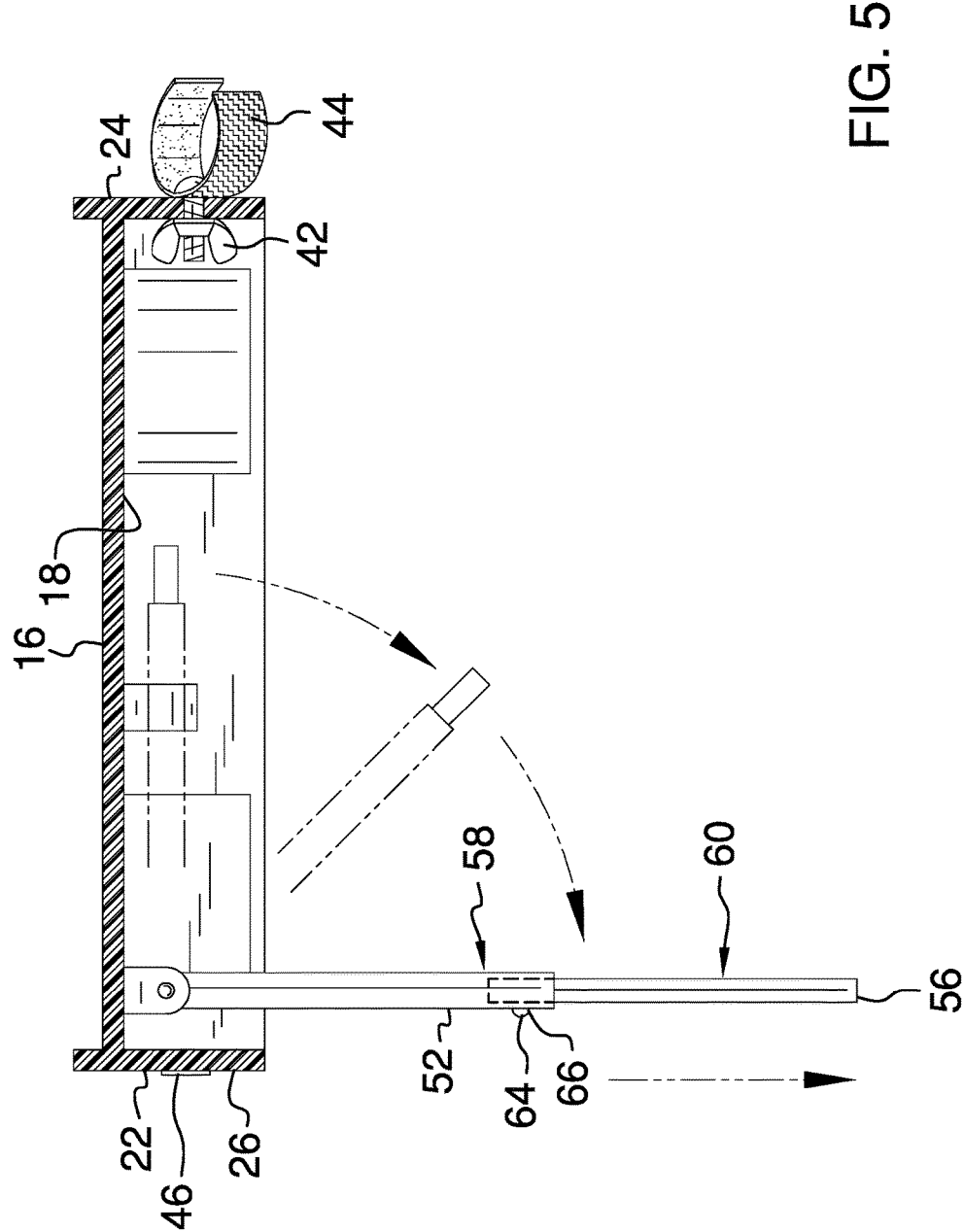
FIG. 5 is a cross sectional view taken along line 5-5 of FIG. 3 of an embodiment of the disclosure.
Figure 6:
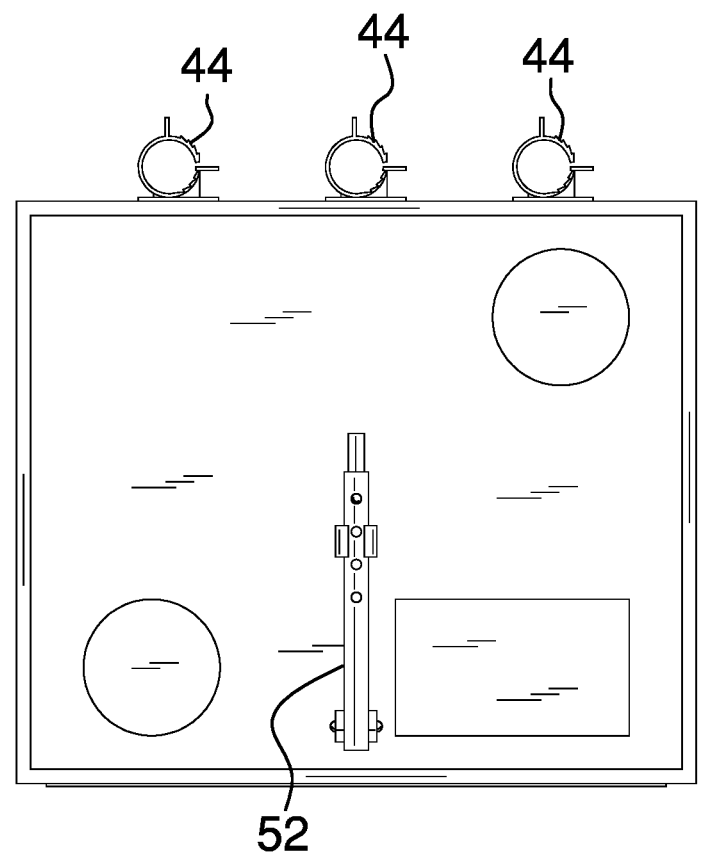
FIG. 6 is a bottom perspective view of an embodiment of the disclosure.
Figure 7:
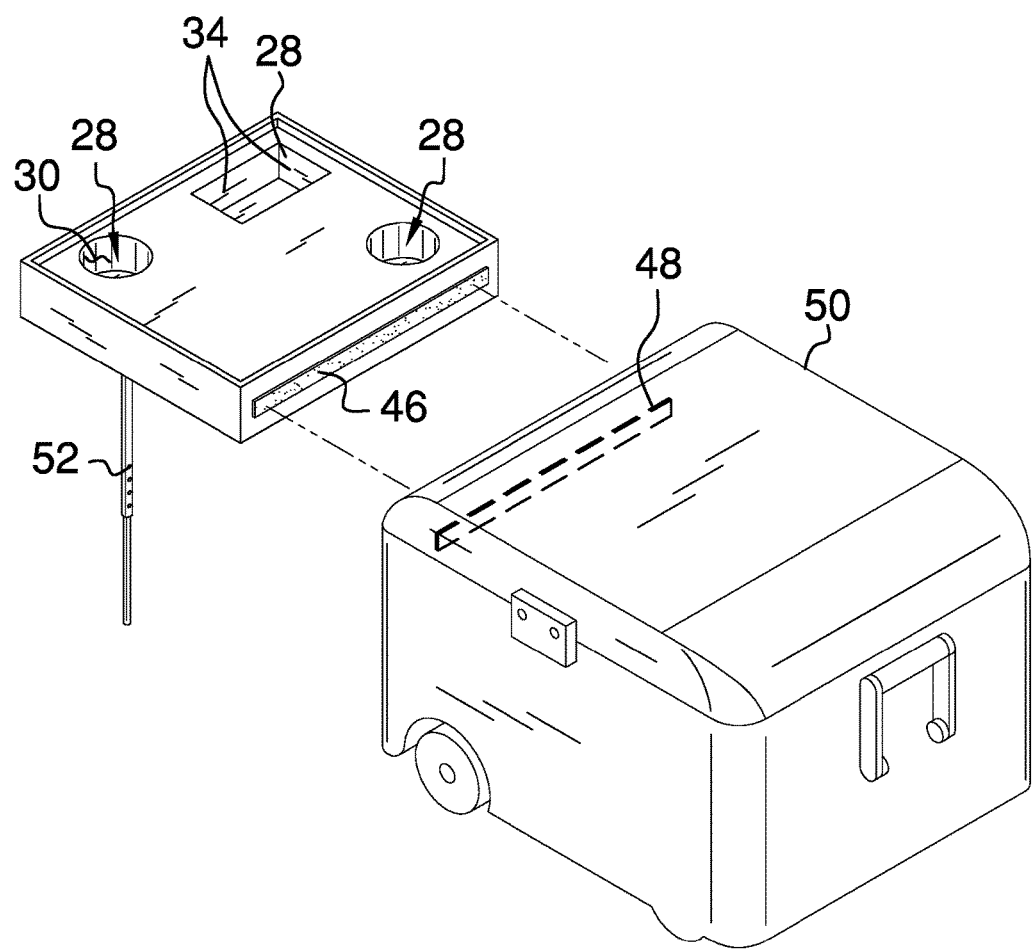
FIG. 7 is a top front side perspective view of an embodiment of the disclosure.

With reference now to the drawings, and in particular to FIGS. 1 through 7 thereof, a new table device embodying the principles and concepts of an embodiment of the disclosure and generally designated by the reference numeral 10 will be described.

As best illustrated in FIGS. 1 through 7, the portable table assembly 10 generally comprises a table 12 that may support items 14. The table 12 has a top surface 16, a bottom surface 18 and a peripheral edge 22 extending therebetween. The peripheral edge 20 has a first side 24 and a second side 26. The first side 24 is spaced from the second side 26. The peripheral edge 20 extends downwardly beyond the bottom surface 18 and upwardly beyond the top surface 16.

The top surface 16 has a plurality of wells 28. Each of the wells 28 extends toward the bottom surface 18. Each of the wells 28 may have an item 14 placed therein. Thus, the item 14 is inhibited from tipping.

Each of the wells 28 has a bounding surface 30. The plurality of wells 28 may include a pair of first wells 32 and a second well 33. The bounding surface 30 corresponding to each of the first wells 32 may be continuous. Thus, each of said first wells 32 may have a cylindrical shape thereby facilitating each of the first wells 32 to contain a beverage container. The bounding surface 30 corresponding to the second well 33 may have a plurality of intersecting sides 34. Thus, the second well 33 may have a rectangular shape.

The first side 24 of the table 12 has a plurality of slots 36 extending therethrough. The slots 36 are spaced apart from each other and are distributed on the first side 24. Moreover, each of the slots 36 is horizontally oriented. A plurality of fasteners 38 is provided and the fasteners 38 are movably coupled to the table 12. Each of the fasteners 38 may be selectively coupled to a chair 40. Thus, the table 12 may be accessible from the chair 40. The chair 40 may be a folding beach chair or the like. Each of the fasteners 38 is moved to accommodate a variety of chair 40 sizes.

Each of the fasteners 38 comprises a plurality of bolts 42 and each of the bolts 42 is slidably positioned in an associated one of the slots 36. Each of the bolts 42 is positionable a selected distance apart from each other. Thus, each of the bolts 42 may be aligned with an associated one of a plurality of supports 41 on the chair 40. Each of the bolts 42 is selectively tightened in the associated slot 36 such that each of the bolts 42 is retained at a selected point along the associated slot 36.

A plurality of straps 44 is provided and each of the bolts 42 extends through an associated one of the straps 44. Each of the straps 44 is matable to themselves. Each of the straps 44 may be wrapped around the associated supports on the chair 40. Thus, the table 12 may be removably coupled to the chair 40. Each of the straps 44 may comprise a hook and loop fastener or the like.

A first coupler 46 is provided and the first fastener 46 is attached to the table 12. The first coupler 46 is positioned on the second side 26 of the table 12. A second coupler 48 is provided and the second coupler 48 may be coupled to an object 50. The object 50 may be a cooler or the like. The first coupler 46 engages the second coupler 48. Thus, the table 12 may be selectively coupled to the object 50. Each of the first coupler 46 and the second coupler 48 may comprise complementary hook and loop fasteners or the like.

A leg 52 is hingedly coupled to the table 12. The leg 52 is selectively positioned in a deployed position to abut a support surface 54. Thus, the table 12 may be horizontally oriented with respect to the support surface 54. The leg 52 is positioned on the bottom surface 18 and the leg 52 has a distal end 56 with respect to the bottom surface 18. The distal end 56 may abut the support surface 54. The leg 52 is selectively positioned in a stored position having the leg 52 being coextensive with the bottom surface 18.

The leg 52 comprises a first half 58 that is slidably coupled to a second half 60. Thus, the leg 52 has a telescopically adjustable length. The first half 58 has a plurality of apertures 62 extending therethrough. The apertures 62 are spaced apart from each other and are distributed along the first half 58.

A lock 64 is provided. The lock 64 is movably coupled to the second half 60 and the lock 64 may be manipulated. The lock 64 engages a selected one of the apertures 62 such that the leg 52 is retained at a selected length. The lock 64 may comprise a ball 66 that is biased outwardly from the second half 60 or the like.

In use, each of the bolts 42 is manipulated in the associated slot 36 to align each bolt 42 with the associated support on the chair 40. Each of the straps 44 is wrapped around the associated support 40. The leg 52 is positioned in the deployed position to support to table 12 in a horizontal orientation with the support surface 54. The items 14 are positioned in selected wells 28. Alternatively, the first coupler 46 is attached to the second coupler 48 on the object 50. Thus, the table 12 is removably coupled to the object 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable table assembly being configured to be removably attached to a chair, said assembly comprising:
   a table being configured to support items, said table having a top surface, a bottom surface and a peripheral edge extending therebetween, said peripheral edge having a first side and a second side, said first side having a plurality of slots extending therethrough, said slots being spaced apart from each other and being distributed on said first side, each of said slots being horizontally oriented;
   a plurality of fasteners, each of said a fasteners being movably coupled to said table, each of said fasteners being configured to be selectively coupled to a chair thereby facilitating said table to be accessible from the chair, each of said fasteners being movably coupled to said table wherein said plurality of fasteners is configured to accommodate a variety of chair sizes, each of said fasteners comprises a plurality of bolts, each of said bolts being slidably positioned in an associated one of said slots such that each of said bolts is positionable a selected distance apart from each other wherein each of said bolts is configured to be aligned with an associated one of a plurality of supports on the chair, said plurality of fasteners further comprising a plurality of straps, each of said bolts extending through an associated one of said straps, each of said straps being matable to themselves, each of said straps being elongated and positioned parallel to said top surface wherein said straps are configured to be wrapped around an associated vertical one of a plurality of supports on the chair;
   a first coupler being attached to said table, said first coupler being configured to engage an item thereby facilitating said table to be selectively coupled to the item; and
   a leg being hingedly coupled to said table, said leg being selectively positioned in a deployed position wherein said leg is configured to abut a support surface thereby facilitating said table to be horizontally oriented with respect to the support surface.

2. The assembly according to claim 1, further comprising said first side being spaced from said second side, said peripheral edge extending downwardly beyond said bottom surface and upwardly beyond said top surface, said top surface having a plurality of wells extending toward said bottom surface, each of said wells being configured to have an item placed therein thereby inhibiting the item from tipping.

3. The assembly according to claim 2, wherein said leg is positioned on said bottom surface, said leg having a distal end with respect to said bottom surface wherein said distal end is configured to abut the support surface, said leg comprising a first half being slidably coupled to a second half such that said leg has a telescopically adjustable length, said first half having a plurality of apertures extending therethrough, said apertures being spaced apart from each other and being distributed along said first half.

4. The assembly according to claim 3, further comprising a lock being movably coupled to said second half wherein said lock is configured to be manipulated, said lock engaging a selected one of said apertures such that said leg is retained at a selected length.

5. A portable table assembly being configured to be removably attached to a chair, said assembly comprising:
- a table being configured to support items, said table having a top surface, a bottom surface and a peripheral edge extending therebetween, said peripheral edge having a first side and a second side, said first side being spaced from said second side, said peripheral edge extending downwardly beyond said bottom surface and upwardly beyond said top surface, said top surface having a plurality of wells extending toward said bottom surface, each of said wells being configured to have an item placed therein thereby inhibiting the item from tipping, said first side having a plurality of slots extending therethrough, said slots being spaced apart from each other and being distributed on said first side, each of said slots being horizontally oriented;
- a plurality of fasteners, each of said fasteners being movbly coupled to said table, each of said fasteners being configured to be selectively coupled to a chair thereby facilitating said table to be accessible from the chair, each of said fasteners being movably coupled to said table wherein said plurality of fasteners is configured to accommodate a variety of chair sizes, each of said fasteners comprising:
  - a plurality of bolts, each of said bolts being slidably positioned in an associated one of said slots such that each of said bolts is positionable a selected distance apart from each other wherein each of said bolts is configured to be aligned with an associated one of a plurality of supports on the chair, each of said bolts being selectively tightened in said associated slot such that each of said bolts is retained at a selected point along said associated slot, and
  - a plurality of straps, each of said bolts extending through an associated one of said straps, each of said straps being matable to themselves, each of said straps being elongated and positioned parallel to said top surface wherein each of said straps is configured to be wrapped around an associated vertical one of a plurality of supports on the chair thereby facilitating said table to be removably coupled to the chair;
- a first coupler being attached to said table, said first coupler being positioned on said second side of said table, said first coupler being configured to engage an item thereby facilitating said table to be selectively coupled to the item;
- a leg being hingedly coupled to said table, said leg being selectively positioned in a deployed position wherein said leg is configured to abut a support surface thereby facilitating said table to be horizontally oriented with respect to the support surface, said leg being positioned on said bottom surface, said leg having a distal end with respect to said bottom surface wherein said distal end is configured to abut the support surface, said leg comprising a first half being slidably coupled to a second half such that said leg has a telescopically adjustable length, said first half having a plurality of apertures extending therethrough, said apertures being spaced apart from each other and being distributed along said first half; and
- a lock being movably coupled to said second half wherein said lock is configured to be manipulated, said lock engaging a selected one of said apertures such that said leg is retained at a selected length.

* * * * *